United States Patent [19]

Sawada

[11] Patent Number: 5,785,553

[45] Date of Patent: Jul. 28, 1998

[54] ELECTRICAL CONNECTOR

[75] Inventor: Hisashi Sawada, Yokkaichi, Japan

[73] Assignee: Sumitomo Wiring Systems, Ltd., Japan

[21] Appl. No.: 807,761

[22] Filed: Feb. 27, 1997

Related U.S. Application Data

[63] Continuation of Ser. No. 367,099, Dec. 30, 1994, abandoned.

[30] Foreign Application Priority Data

Feb. 7, 1994 [JP] Japan ................... 6-035488

[51] Int. Cl.$^6$ ................................... H01R 13/70
[52] U.S. Cl. ................................ 439/516; 439/620
[58] Field of Search ........................ 439/516, 620–622, 439/402, 727, 76; 335/205–207

[56] References Cited

U.S. PATENT DOCUMENTS

| | | | |
|---|---|---|---|
| 4,699,445 | 10/1987 | Porta et al. | 439/620 |
| 4,875,877 | 10/1989 | Fleak et al. | 439/516 |
| 4,880,388 | 11/1989 | Beamenderfer et al. | 439/516 |
| 4,952,169 | 8/1990 | Hayes, Sr. | 439/402 |
| 5,026,305 | 6/1991 | Del Guidice et al. | 439/620 |
| 5,458,508 | 10/1995 | Sawada | 439/516 |
| 5,476,397 | 12/1995 | Leff et al. | 439/727 |

FOREIGN PATENT DOCUMENTS

| | | | |
|---|---|---|---|
| 192864 | 9/1986 | European Pat. Off. | H01R 23/68 |
| 325362 | 11/1992 | Japan | B60T 11/26 |
| 2260229 | 4/1993 | United Kingdom | H01R 11/01 |
| 2275578 | 8/1994 | United Kingdom | E05B 65/20 |
| 2281822 | 3/1995 | United Kingdom | H01R 13/504 |

*Primary Examiner*—Neil Abrams
*Assistant Examiner*—Brian J. Biggi
*Attorney, Agent, or Firm*—Jordan B. Bierman; Bierman, Muserlian and Lucas

[57] ABSTRACT

This invention aims to protect an electrical element supported in an electrical connector and prevent electrical conduction between electrodes. A lead metal fixture 20 is jacketed by a lead metal fixture cover 12 along with a connector portion 11 in the electrical connector 11 so as to cover portions of the fixture 20 for supporting a reed switch 30. Thus, it is possible to prevent a distal end of the lead metal fixture 20 from being bent such that electrodes 21 and 22 contact with each other when the electrical connector is attached to a reservoir tank. It is also possible to prevent a load from applying directly to the reed switch 30, thereby protecting it from breakage.

5 Claims, 3 Drawing Sheets

ELECTRICAL CONNECTOR

This application is a continuation of application Ser. No. 08/367,099, filed Dec. 30, 1994, now abandoned.

BACKGROUND OF THE INVENTION

(1) Field of the Invention

This invention relates to an electrical connector which directly holds electrical elements.

(2) Statement of the Prior Art

Heretofore, an electrical connector which is disposed on a lower portion of a reservoir tank for brake oil to detect a low level of oil in a reservoir tank has been known. For convenience of explanation, such a kind of an electrical connector will be described below. FIG. 6 is a fragmentary broken-away side elevational view of a conventional electrical connector disclosed in Japanese Patent Public Disclosure No. 4-325362 (1992).

A pair of electrodes 2 and 3 are insert-molded in a connector body 1 made of a resin material. The respective electrodes 2 and 3 are provided on their one ends with end portions 2a and 3a adapted to be detachably coupled to a terminal metal fixture held in a mating connector not shown. The connector body 1 is provided on its end adjacent to the end portions 2a and 3a with a hood adapted to be detachably coupled to the mating connector. The other end portions 2b and 3b extend outwardly from the connector body 1 in the same directions. The electrode 2 is short while the electrode 3 is long. A reed switch 4 is soldered to the other end portions 2b and 3b to be held in parallel to the electrodes 2 and 3. The longer electrode 3 is bent slightly to held the reed switch 4 along the axis of the connector body 1.

A reservoir tank 5 is provided in its lower part with a lateral hole extending horizontally. A magnet-not shown is disposed in the lateral hole so that it can move up and down in the hole. The magnet is connected to a float not shown. The connector body 1 is provided on its other end with a portion which holds the reed switch 4 to insert it into the lateral hole and is closely fitted in an open end of the lateral hole.

There are the following problems in the above conventional electrical connector. The electrodes are bent to contact with each other when they are inserted slantwise into the lateral hole, because the electrodes serve to connect and support the reed switch. Since the reed switch receives a stress directly when the electrodes are bent, the reed switch made of glass will be broken. Further, upon soldering of the reed switch, spilt solders will bridge exposed electrodes.

SUMMARY OF THE INVENTION

An object of the present invention is to provide an electrical connector which protects an electrical element held therein and prevents electrical conduction between electrodes.

In order to achieve the above object, an electrical connector of the present invention comprises: a connector portion adapted to be coupled to a mating connector; a lead metal fixture cover made of a resin material and joined to a rear end opposite to an inlet port of the connector portion; lead metal fixture inserted in a holding aperture in said connector portion and embedded in the cover, the fixture being projected in the inlet port at its distal end so as to be electrically coupled to a metal fixture in the mating connector; and an electrical element received in a groove in the cover so as to be electrically connected to the lead metal fixture. The lead metal fixture includes a plurality of electrodes united to each other at a joint portions. The fixture is embedded in the cover in a manner of exposing the joint portions so that they can be cut off after molding.

The lead metal fixture cover is provided with a positioning member which holds the electrical element at a given position in the cover.

The lead metal fixture includes a plurality of terminal portions exposed from the cover adapted to be soldered to the electrical element. The lead metal fixture cover is provided with partitions disposed between the terminal portions.

In the electrical connector of the present invention, it is possible to maintain the electrodes in a spaced position even if a bending force is applied to the electrodes, because the lead metal fixture is covered with resin and thus the resin-covered fixture supports the electrical element.

Also, since the lead metal fixture has a plurality of electrodes portions coupled to each other and the lead metal fixture cover is joined to the exposed joint electrode portions, the joined electrodes are set as they are upon molding and the coupled portion is cut off after molding.

Further, the lead metal fixture cover is provided with the positioning member which holds the electrical element at the given position.

The lead metal fixture has a plurality of terminal portions exposed from the cover to solder the electrical element thereto and the partitions formed in the cover can prevent the solder from flowing between the terminal portions to bridge them.

Since the lead metal fixture cover jackets the lead metal fixtures, it is possible to provide an electrical connector which can prevent conduction between electrodes and prevent an external force from being applied to the electrical element directly.

According to the present invention, since the electrodes are joined upon molding, the connector body can be easily assembled in a molding device and the electrodes can be readily cut off at the coupled and exposed portion, thereby preventing the electrodes from lowering the function. In particular, it is possible to prevent the electrodes from approaching each other upon molding since the electrodes are joined to each other upon molding.

In addition, it is possible to improve an accuracy of positioning since the positioning member formed in the lead metal fixture cover can hold the electrical element at the suitable position. It is also possible to simplify the soldering process since the positioning member can easily hold the electrical element.

The spilt solders do not bridge the electrodes on account of existence of the partition between the electrodes.

DETAILED DESCRIPTION OF THE PREFERRED EMBODIMENTS

Figure 1:
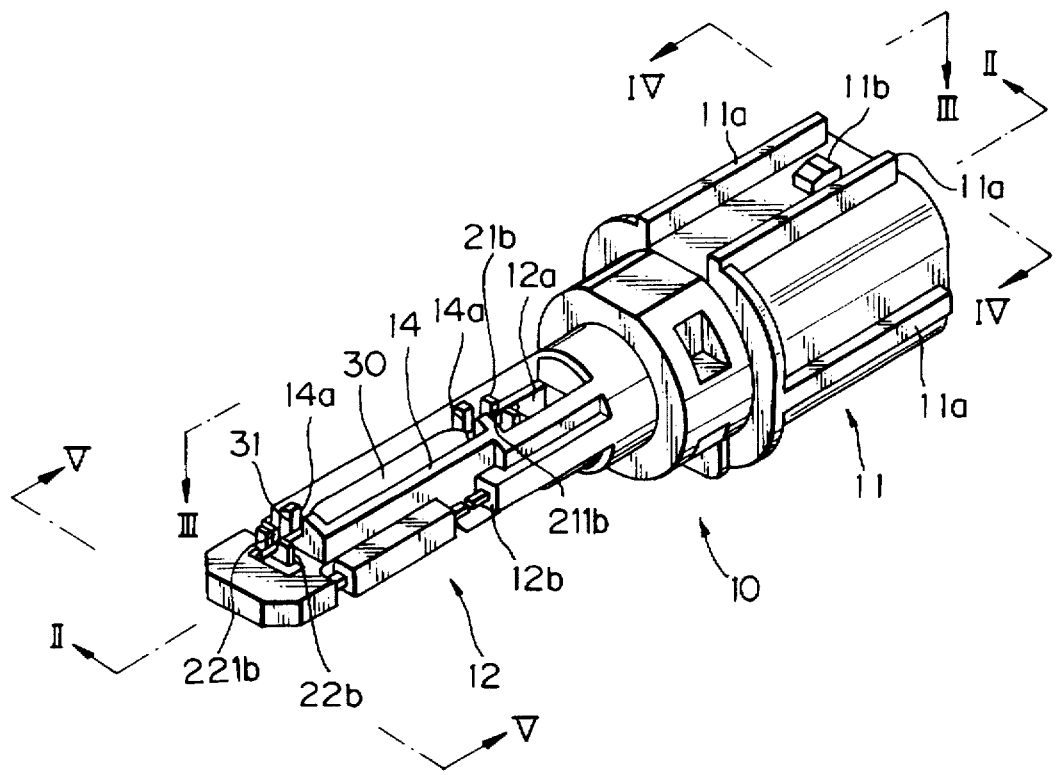
FIG. 1 is a perspective view of an embodiment of an electrical connector of the present invention.

Referring now to FIGS. 1 to 5, an embodiment of the present invention will be explained below. In this embodiment, an electrical connector which has a reed switch is mounted on a reservoir tank.

An electrical connector 10 has a lead metal fixture 20 including a pair of electrodes which are arranged horizontally in parallel to each other and covered with a resin material. The electrical connector 10 is provided on its one end with a cylindrical connector portion 11 and on its other end a lead metal fixture cover 12 which is formed into a bar-like shape and holds a reed switch 30 on an upper face.

One ends 21a and 22a of electrodes 21 and 22 which constitute the lead metal fixture 20 are adapted to be detachably coupled to female terminal metal fixture held in a mating connector not shown. Thus, the lead metal fixture 20 serves as a male terminal metal fixture. The ends 21a and 22a are projected in the connector portion 11. The electrodes 21 and 22 are joined to each other at two joint portions 23 and 24 shown by two-dot chain lines in FIG. 2 at first. As shown in the drawing, the electrode 21 is cut off at an intermediate position in the cover 12 while the electrode 22 extends near a distal end of the cover 12. The electrodes 21 and 22 are provided on their distal ends with terminal portions 21b and 22b bent upwardly. As shown in FIG. 1, the terminal portions 21b and 22b are provided on their center ends with grooves adapted to support leads 31 of the reed switch 30. The terminal portions 21b and 22b stand vertically on the center of the cover 12 in its width direction.

Figure 3:
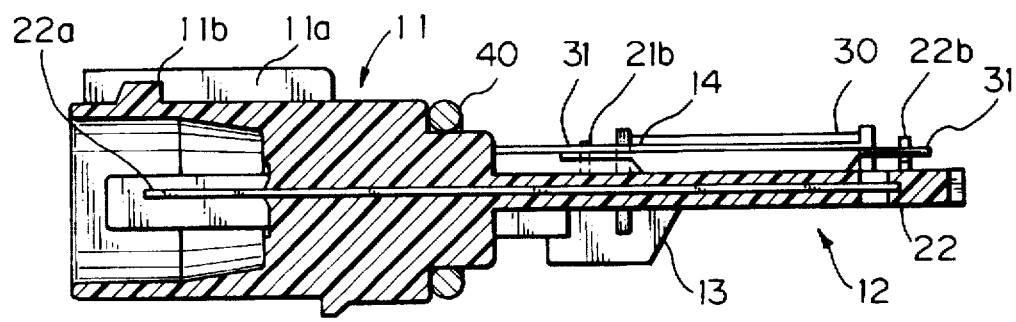
FIG. 3 is a longitudinal vertical section looking from the lower right to the upper left of the connector of FIG. 1.
Figure 4:
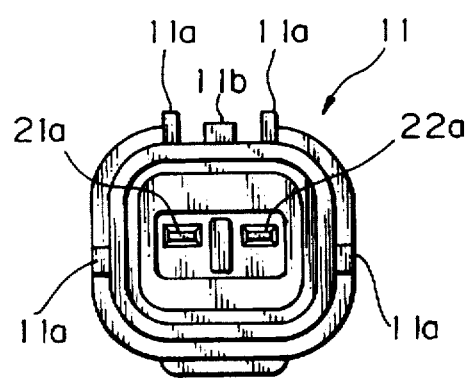
FIG. 4 is a front elevational view of a connector section taken along lines IV—IV in FIG. 1.
Figure 5:
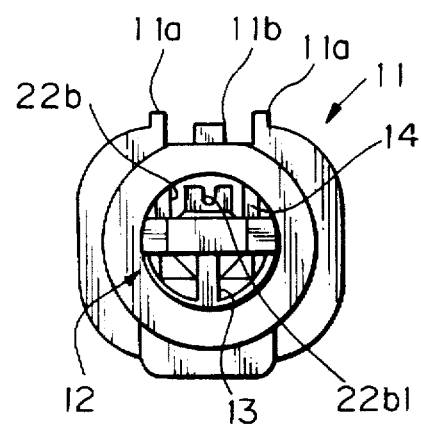
FIG. 5 is a front elevational view of a lead metal fixture cover taken along lines V—V in FIG. 1.
Figure 6:
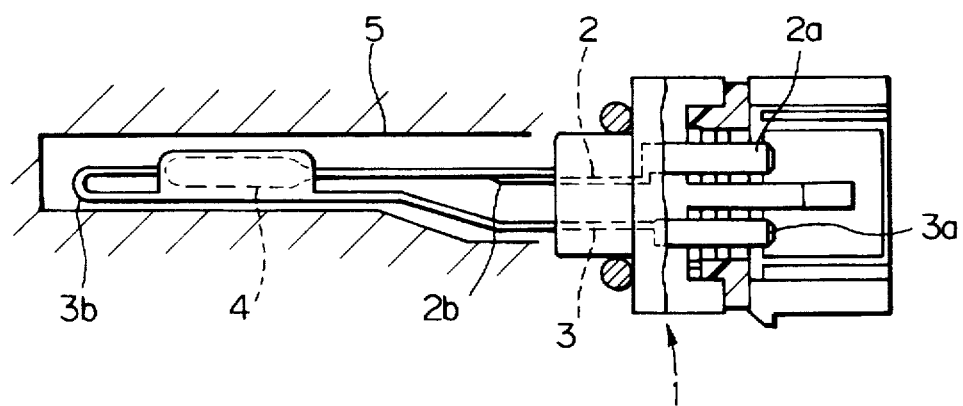
FIG. 6 is a fragmentary broken-away side elevational view of a conventional electrical connector.

The lead metal fixture cover 12 which jackets the terminal portions 21b and 22b of the electrodes 21 and 22 is formed into a plate-like shape and is provided on its lower face with a rib 13 (see FIG. 3). The terminal portions 21b and 22b project from the upper face of the cover 12. The cover 12 is provided on its upper face with a rib 14 which encloses the reed switch 30. The rib 14 is provided on its opposed lateral sides with grooves 14a, 14a through which the leads 31 of the reed switch 30 pass. The rib 14 serves to position the reed switch 30 and to separate the electrodes 21 and 22 as a partition.

Figure 2:
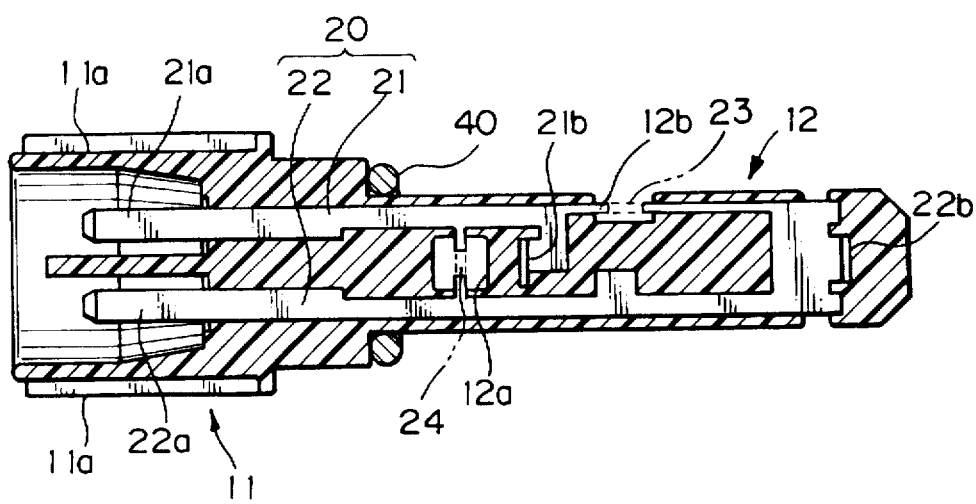
FIG. 2 is a longitudinal horizontal section looking down on the connector of FIG. 1.

The lead metal fixture cover 12 is formed so that the joint portions 23 and 24 of the electrodes 21 and 22 are exposed. As shown in FIG. 2, the cover 12 is provided in its center portion with a window 12a and its side portion with a window 12b.

The lead metal fixture cover 12 is joined to the connector portion 11. The connector portion 11 is formed into a cylindrical shape adapted to be coupled to the mating connector which supports the female terminal metal fixture and is provided on its outer periphery with positioning ribs 11a and a fitting projection 11b. A reservoir tank not shown is provided with a lateral hole which receives the lead metal fixture cover 12 and a part of the connector portion 11. An O-ring 40 is mounted around a proximal end of the cover 12 so as to seal a clearance between an inner periphery of the lateral hole and the cover 12.

The above electrical connector is produced by the following processes.

At first, the electrodes 21 and 22 of the lead metal fixture 20 are joined at the joint portions 23 and 24 shown by the two-dot chain lines in FIG. 2 and the terminal portions 21b and 22b stand vertically on the distal ends of the electrodes 21 and 22. The electrodes 21 and 22 are inserted into a mold and molten resin is poured into an interior of the mold to form the connector portion 11 and lead metal cover 12 integrally. Thereafter, the electrodes 21 and 22 are cut off at the joint portions 23 and 24 exposed from the windows 12b and 12a in the cover 12. The coupling portions 23 and 24 may be cut off after the electrodes 21 and 22 are inserted into the mold. A work of disposing of the electrodes 21 and 22 in the mold can be improved, because the electrodes 21 and 22 are joined to each other.

Then, the reed switch 30 with leads 31 having a suitable length is positioned to be enclosed by the rib 14. The reed switch 30 is positioned at the given position in the cover 12 merely by inserting the leads 31, 31 into the grooves 14a, 14a in the rib 14, thereby preventing the reed switch 30 from being displaced in the next steps. Since the grooves 14a, 14a and the grooves 211b, 221b in the terminal portions 21b, 22b are aligned along a straight line, the leads 31, 31 are inserted into the grooves 211b, 221b.

After the reed switch 30 is put on the cover 12, the leads 31, 31 are soldered to the terminal portions 21b, 22b. Even if solders are spilt from the terminal portions 21b and 22b during a soldering process, the solders fall on only the cover 12 and they do not drop on the electrodes 21 and 22.

The electrical connector 10 thus assembled is inserted into the lateral hole in the reservoir while directing the cover 12 to the hole. Even if the cover 12 is pushed slantwise into the hole, the electrode 21 and 22 are not shorted since the cover 12 jackets them. Since the external force exerted upon such slant insertion is distributed over the whole cover 12, a stress is not concentrated on the reed switch 30. Consequently, the reed switch 30 is not broken in this case.

Thus, it is possible to prevent the lead metal fixture 20 from being bent at its distal end and to prevent the electrodes 21 and 22 from contacting with each other when the connector is mounted on the reservoir tank, because the cover 12 jackets the lead metal fixture 20 together with the connector portion 11. It is possible to prevent the reed switch 30 from being broken because a load is not applied to the reed switch 30 directly.

Although the connector holds the reed switch in the above embodiment, the reed switch may be another electrical element. Although the connector is made of a resin material, it may be made of an insulation material. In the case that the reed switch has a resistance against bending, the lead metal fixture may be made of a flexible material.

What is claimed is:

1. An electrical connector comprising:

a connector portion adapted to be coupled to a mating connector;

an insulative fixture cover joined to a rear end opposite an inlet port of said connector portion;

a first conductive fixture inserted in a holding aperture in said connector portion and embedded in said cover, said first fixture extending into said inlet port at a distal end and electrically coupled to a second conductive fixture in said mating connector, said first fixture including at least one electrode having a first joint point at which said electrode is to be cut off, and a second joint point at which said electrode is to be cut off, said first fixture embedded in said cover so that said first joint point and said second joint point are exposed and can be cut off after molding, and an electrical element in a groove in said cover electrically connected to said first fixture, said cover having a reed switch on its upper face, said switch being encased by a rib;

whereby said first joint point and said second joint point are adapted to make electrical contact with corresponding leads extending from said reed switch.

2. The electrical connector of claim 1 wherein there are two said electrodes united with each other at two points.

3. The electrical connector of claim 1 wherein said first fixture includes a plurality of exposed terminal portions adapted to be electrically connected to said reed switch, and wherein said cover is provided with partitions disposed between said terminal portions.

4. The electrical connector of claim 3 wherein said terminal portions are soldered to said reed switch.

5. The electrical connector of claim 1 wherein said first fixture is a plurality of electrodes united with each other.

* * * * *